(12) United States Patent
Greer

(10) Patent No.: US 6,349,565 B1
(45) Date of Patent: Feb. 26, 2002

(54) CO2 BLOCK PRESS

(75) Inventor: Brian Greer, Monroe, GA (US)

(73) Assignee: Tomco₂ Equipment Company, Loganville, GA (US)

( * ) Notice: Subject to any disclaimer, the term of this patent is extended or adjusted under 35 U.S.C. 154(b) by 0 days.

(21) Appl. No.: 09/659,178

(22) Filed: Sep. 11, 2000

Related U.S. Application Data

(60) Provisional application No. 60/182,123, filed on Feb. 12, 2000.

(51) Int. Cl.⁷ .................................................. B01D 7/00
(52) U.S. Cl. ......................................................... 62/543
(58) Field of Search ........................... 62/532, 534, 543, 62/341

(56) References Cited

U.S. PATENT DOCUMENTS 3,952,530 A * 4/1976 Tyree, Jr. ........................ 62/10
5,069,044 A * 12/1991 Holum et al. .................. 62/320
5,845,516 A * 12/1998 Allen, Jr. ....................... 62/605
6,244,069 B1 * 6/2001 Hyde, Jr. et al. .............. 62/604

* cited by examiner

*Primary Examiner*—William Doerrler
*Assistant Examiner*—Malik N. Drake
(74) *Attorney, Agent, or Firm*—Todd Deveau; Ryan A. Schneider; Troutman Sanders LLP

(57) ABSTRACT

An improved dry ice pelletizer and method for significantly increased pellet production. The improvement consists of multiple injection ports used for the timed introduction of liquid carbon dioxide into a dry ice extrusion cylinder so that the cylinder can be more completely filled with carbon dioxide snow before extrusion takes place. Part of the improvement stems from the use of a solid mass of carbon dioxide, called a puck, which is chamfered and serves to capture carbon dioxide vapor and snow within the compression cylinder. The resulting improvement in carbon dioxide pellet output is roughly 400% over that achieved by conventional methods. The inventive improvement may also be installed as a retrofit to conventional dry ice pellet extrusion machines.

19 Claims, 5 Drawing Sheets

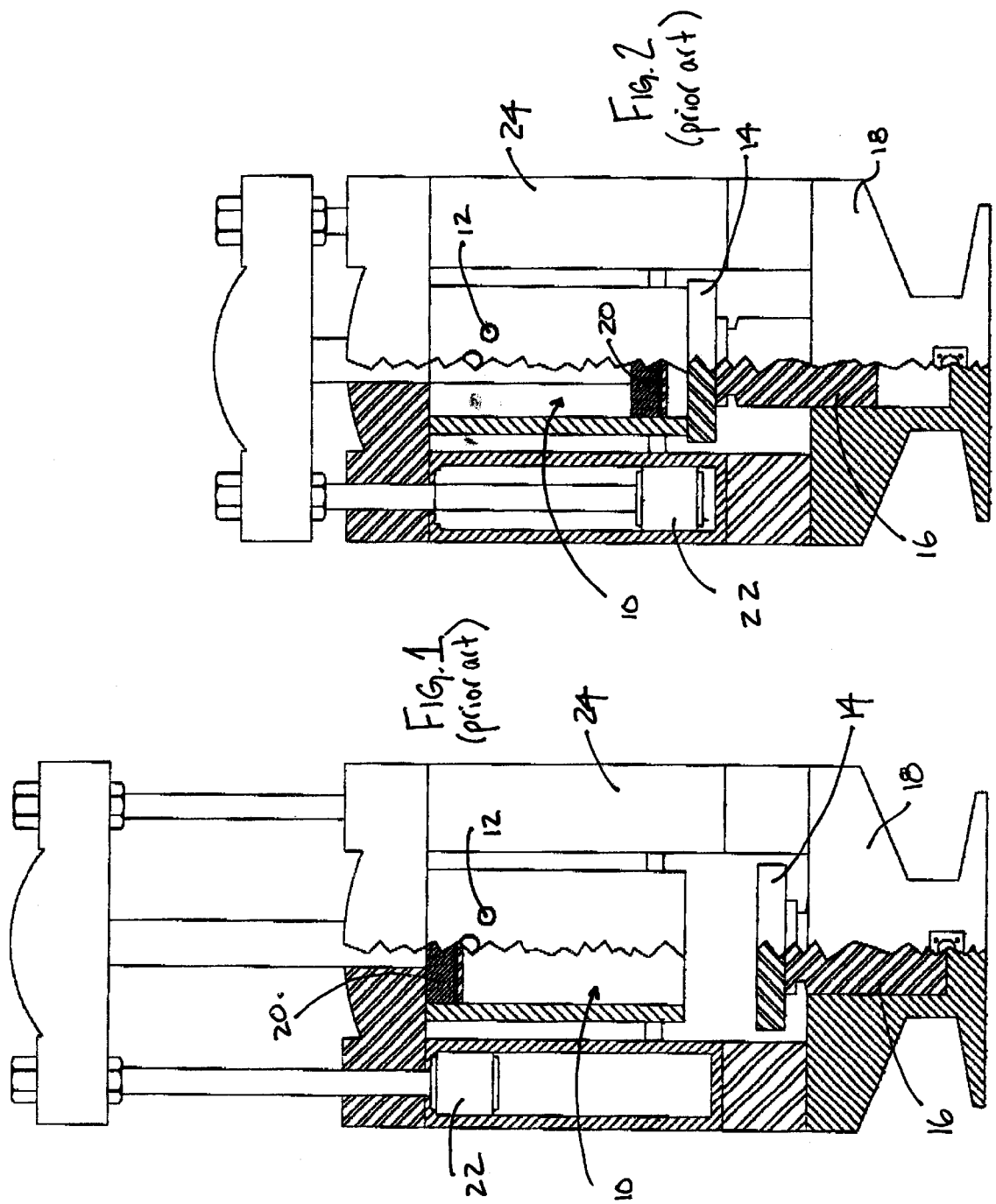

CO2 BLOCK PRESS

This application claims benefit of provisional application 60/182,123, filed Feb. 12, 2000.

BACKGROUND OF THE INVENTION

1. Field of the Invention

This invention relates generally to the field of dry ice manufacturing, and more particularly to a method and apparatus for producing blocks of dry ice. 2. Description of Related Art Dry ice is the solid state of carbon dioxide ($CO_2$). There are a vast array of applications for dry ice, including the processing and preservation of meats and other foods. Dry ice is the preferred means of cooling in such applications, since it imparts no color, odor, or taste, and has no lingering deleterious effect on the food. Dry ice also is desirable for the processing of food because its sublimes directly from the solid state to the gaseous phase, leaving no residue behind after yielding its cooling effect; therefore, no clean-up or removal of residual liquid is required. Furthermore, $CO_2$ is neither toxic, poisonous, reactive with other chemicals, nor flammable.

In its solid state, at standard temperature and pressure, carbon dioxide has a constant and stable temperature of $-109.33°$ F. Carbon dioxide is normally transported in its liquid state, and stored in refrigerated vessels at a pressure of about 305 psia, and a corresponding temperature of about $0°$ F.

Once the liquid $CO_2$ reaches the manufacturing facility, dry ice is generally formed into one of the two final forms, blocks of dry ice or smaller pellets. Large blocks of dry ice typically are shipped long distances or stored for extended periods, as pellet size pieces sublimate faster.

The basic process for making block dry ice from liquid carbon dioxide has long been known. Dry ice block manufacture has changed little in the last sixty-five years or so. Over this time, various kinds of apparatuses for carrying out this basic process have been devised. Typical of such conventional apparatus is that which is the subject of Great Britain Complete Specification No. 433,018, accepted Aug. 7 1935. Commonly, present ice block manufacturing incorporates the Southwark-Baldwin press. This machine can produce a 220-pound block of ice. This type of dry ice block press utilizes what is conventionally referred to as a liquid injection process.

The liquid injection process injects liquid $CO_2$ and a binding agent at a pressure above the triple point of $CO_2$ into the top of a compression chamber. Liquid $CO_2$ is supplied to the compression chamber from a remotely located $CO_2$ supply. When the injection process is complete, the liquid $CO_2$ in the chamber drops below the triple point and undergoes a phase change, thus producing solid $CO_2$ (snow).

The amount of liquid $CO_2$ injected into the compression chamber does not produce a complete block of dry ice until the chamber reaches a minimum equilibrium temperature. For example, the minimum equilibrium temperature of TOMCO$_2$ ice machines is approximately $-50°$ F. This temperature naturally varies between press types. This process of reaching a minimum equilibrium temperature is similar to the cool down period ice machines go through before they start producing blocks that are considered complete.

The liquid $CO_2$ is permitted to flash through an expansion device and enter the compression chamber over the triple point pressure from a nominal storage pressure, for example, 100 psia, wherein part of the liquid will turn into gas and part of the liquid will solidify. The proportionate amounts of gaseous $CO_2$ and solid $CO_2$ depend on the pressure and temperature of the liquid $CO_2$ fed into the chamber. The lower the pressure and temperature, the greater the proportion of solid $CO_2$ formed as a result of the free expansion. Liquid $CO_2$ initially at about 300 psia and approximately $-8°$ F., when allowed to rapidly expand to atmospheric pressure, yields approximately 1.0 pound of dry ice as snow and about 1.5 pounds of vapor.

The gaseous $CO_2$ is released through an exhaust port typically located near the top of the chamber, and returned to either a recovery unit or the atmosphere. A hydraulic press then compresses the $CO_2$ snow until a preset hydraulic pressure is obtained.

A timer generally determines the amount of liquid $CO_2$ injected into the chamber. However, with a timer, there is no compensation for the loss of $CO_2$ due to the chamber temperature (i.e., the internal heat of steel). Further, this conventional dry ice process does not incorporate controls either to vary the ice block size, or to provide blocks with uniform block density.

Sometimes, blocks of dry ice from a block press are reduced to a smaller size that can more easily be handled and used in many types of applications. Other machines, for example the dry ice pelletizer, produces dry ice pellets. Dry ice pellets are easily packaged by the manufacturer and subdivided by the consumer into convenient portions for use.

Several disadvantages of conventional dry ice manufacturing processes are known, and include: the requirement of mixing a binding agent with the liquid $CO_2$ prior to injection into the compression chamber; the incomplete and inefficient vapor removal from the compression chamber; the low vapor exhaust rates; the production of blocks having non-uniform densities; and the production limit of single-sized product. Therefore it can be seen that there is a need in the art for an improved dry ice block press that overcomes these and other prior art deficiencies.

BRIEF SUMMARY OF THE INVENTION

Briefly described, in a preferred form, the present invention is a dry ice block manufacturing process including a $CO_2$ storage vessel to store and deliver the liquid $CO_2$, a dry ice production assembly to transform the stored $CO_2$ into ice blocks, an automated analysis system.

The $CO_2$ storage vessel incorporates a supply line to supply the dry ice production assembly with liquid $CO_2$. A supply flow meter can be located in the flow path of the supply line.

The dry ice production assembly of the present invention comprises a compression chamber, a compressing mechanism and a heating element. Liquid $CO_2$ flows from the $CO_2$ storage vessel, through the supply line and flow meter, and then introduced into the compression chamber through one or more injection ports. The liquid $CO_2$ injected into the chamber then changes into gaseous and solid forms of $CO_2$. The compression chamber also has one or more venting ports for the release of built-up pressure, in the form of $CO_2$ vapor, in the chamber, as the liquid $CO_2$ proceeds through phase changes.

The compressing mechanism of the dry ice production assembly then compresses the resulting $CO_2$ snow in the compression chamber into a single mass of solid dry ice. The compressing mechanism includes a piston and piston rod.

Heat is then applied by the heating element of the dry ice production assembly to the chamber walls in proximity to the dry ice block after compression in order to facilitate vapor and product removal from the chamber without dwell time. The introduction of heat also contributes to uniform block density and removes the need to combine the injected $CO_2$ with a binding agent as is presently done in conventional block manufacturing.

The automated analysis system enables the dry ice production assembly to directly connect to the $CO_2$ storage vessel, and controls the entire process.

The present dry ice block manufacturing process incorporates numerous novel improvements over conventional press methods. For example, a first advantage of the press of the present invention is a chamber retention assembly of the compression chamber that enables free expansion and contraction of the chamber with temperature changes within the chamber. This freedom of movement prevents damage to the chamber caused by the stresses and strains due to temperature changes.

The chamber can further include filter media placed over one or more of the venting ports in order to maximize the vapor exhaust rate of $CO_2$ from the chamber. Filters over the venting ports allow such a rapid exhaust rate without traditional concerns including the loss of snow into the exhaust piping. Without the present filters, escaping snow would accumulate and damage machinery downstream of the chamber, such as a recovery.

Yet, another improvement is an ultra high molecular weight (UHMW) polyethylene surface plate on the piston of the compressing mechanism to prevent the top of the formed ice block from being damaged and sticking to the piston during compression.

A fourth improvement involves the heating element of the dry ice production assembly; the heating element capable of transferring heat to the ice block formed inside the compression chamber. The heat sublimates a portion of the block, enabling trapped $CO_2$ vapor in the block to escape the block and exit the chamber. The heat also enables the present press to operate without dwell time. This addition of heat is one of several steps that permits the present press to consistently provide uniform blocks of ice through an entire run.

The automated analysis system of the present invention permits the production of uniform blocks by monitoring the temperature of the various components of the dry ice production assembly, including the compression chamber and the compressing mechanism. Based on changes in temperature of the chamber and of the related components, the amount of $CO_2$ injected into the chamber is adjusted to compensate for these temperature changes. As temperatures rise, so too does the amount of injected liquid $CO_2$ (by weight) to form a constant block (by weight) of ice.

One consequence of the constant automated monitoring and adjusting of the present process is the ability to program the present press with a predetermined desired block weight, and to have such uniform blocks manufactured time and again during the entire process run, without regard to human oversight and adjustment to the process.

Yet a seventh improvement over the prior art is the ability of the automated analysis system to monitor $CO_2$ usage via the supply flow meter of the $CO_2$ storage vessel that can tally the amount of $CO_2$ that has passed through the flow meter.

Accordingly, it is an object of the present invention to provide an improved dry ice block press and method of ice block production.

It is a further object of the present invention to provide a block press incorporating a heating element to transfer heat energy to the ice inside the chamber in order to sublimate a micro-thin layer of the dry ice block, which limits or eliminates dwell time.

It is another object of the present invention to provide a press with filter media placed over the venting ports of the compression chamber.

It is another object of the present invention to provide a press that produces blocks of dry ice with uniform block densities over a range of block sizes.

These and other objects, features and advantages of the present invention will become more apparent upon reading the following specification in conjunction with the accompanying drawing figures.

BRIEF DESCRIPTION OF THE FIGURES

FIG. 1 is a cross-sectional view of a prior art dry ice press.

FIG. 2 is a second cross-sectional view of the prior art dry ice press of FIG. 1.

DETAILED DESCRIPTION OF A PREFERRED EMBODIMENT

Figure 3:
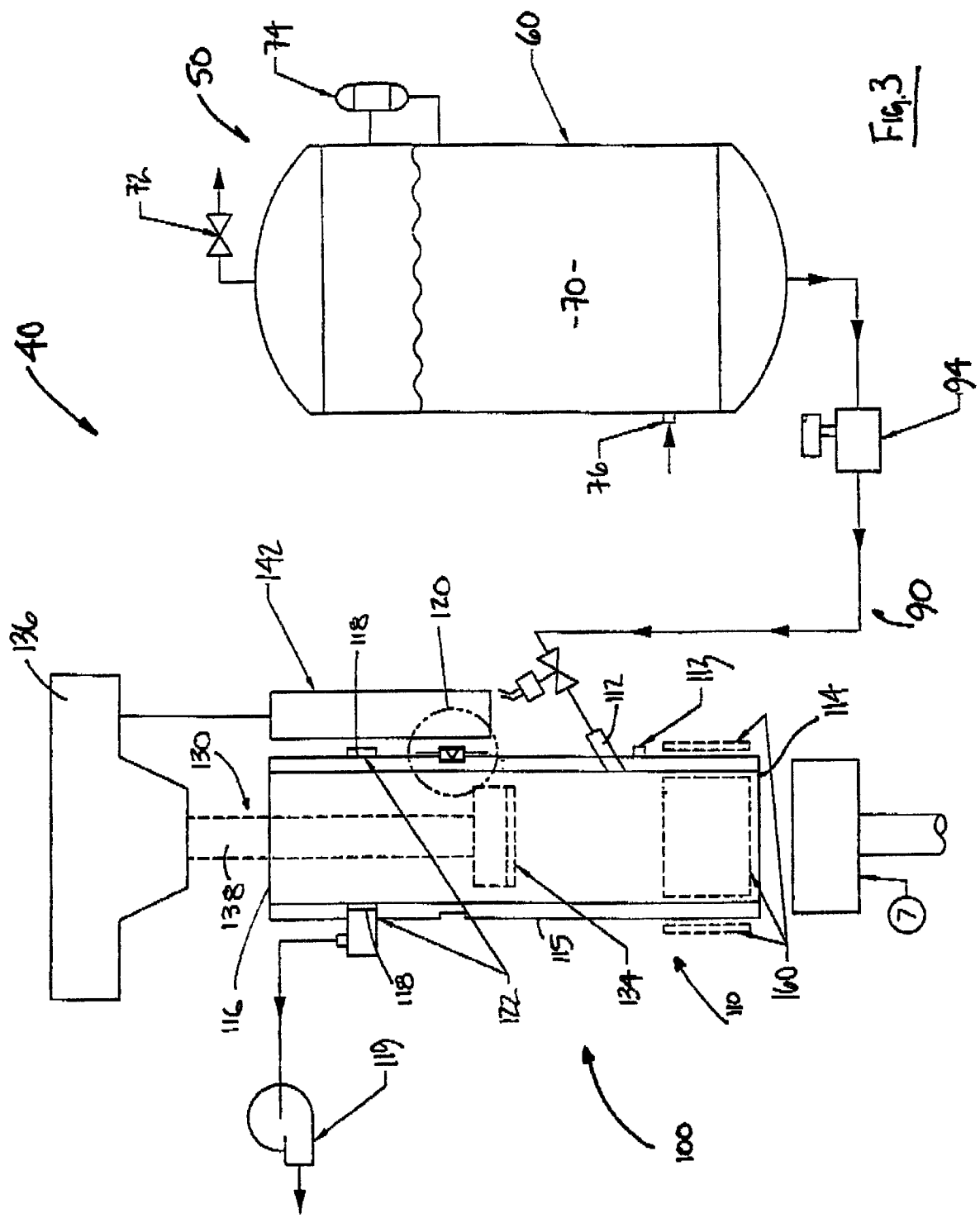
FIG. 3 is a side view of the present invention according to a preferred embodiment.

Referring to the drawings of the present application, FIGS. 1 and 2 are provided as background and illustrate section views of a conventional Southwark-Baldwin press. As shown in these figures, a charging cylinder 10 is provided with an inlet nozzle 12 at its upper end. The charging cylinder 10 carries an annular piston 20 thereon that is slidable within the chamber 10. A press plunger 14 is mounted for vertical movement towards the press cylinder 10, and carries a piston 16 on its lower end that is received within a cylinder 18, and that is also operable by hydraulic pressure to raise and lower the press plunger 14.

Liquid carbon dioxide is sprayed into the charging cylinder 10 through the inlet nozzle 12, with the plunger 14 in a closed position. As the carbon dioxide is sprayed from the nozzle 12, it changes to dry ice snow through adiabatic expansion and accumulates in the charging cylinder 10. When a sufficient quantity of dry ice snow has been formed, the annular piston 20 moves downward under hydraulic pressure from cylinders 22, 24. Once the piston 20 reaches the snow, it compacts the snow into a hard block of ice. The plunger 14 then moves downward removing the formed block of dry ice. The block is then removed, and the apparatus is ready for another cycle. While the above apparatus can successfully produce cylindrical blocks of dry ice, it is not fully satisfactory for all applications, embodying the numerous disadvantages discussed earlier.

The present invention provides a method and apparatus for making blocks of dry ice from liquid carbon dioxide that controls the problem of trapped gaseous carbon dioxide in the dry ice block, and that can repeatedly and rapidly produce dry ice blocks of high quality and substantially uniform characteristics. Referring now to FIG. 3, a side view of the present invention 40 is shown. The dry ice block manufacturing process 40 comprises $CO_2$ storage vessel 50, dry ice production assembly 100 and automated analysis system 170.

The $CO_2$ storage vessel 50 includes a $CO_2$ source 60 and a supply line 90 to supply the dry ice production assembly 100 with liquid $CO_2$. The supply line 90 can incorporate a supply flow meter 94. The block process of the present invention begins by filling the $CO_2$ source 60, preferably a flash vessel 70, with liquid $CO_2$ via liquid $CO_2$ supply nozzle 76. The flash vessel 70 can be remote from the production assembly 100 and can be supported on a press skid (not shown).

Flash vessel 70 is shown further comprising a flash vessel pressure control valve 72 and a level switch 74. Typically, liquid $CO_2$ at a temperature of 0° F. and a pressure of 300 psig is injected into the flash vessel 70. In the flash vessel 70, the temperature of the liquid $CO_2$ falls to about −55° F., and the pressure is lowered to about 90 psig. At least a portion of the $CO_2$ is vaporized and rises thorough the vessel 70 to exit through vessel pressure control valve 72. Level switch 74 monitors the level of liquid $CO_2$ in the vessel 70.

The dry ice production assembly 100 is shown in FIG. 3. Dry ice production assembly 100 comprises compression chamber 110, compressing mechanism 130 and heating elements 160. Liquid $CO_2$ is injected into compression chamber 110, wherein compressing mechanism 130 produces the blocks of dry ice. During production, the heating elements 160 infuse thermal energy into the snow blocks, facilitating the release of gaseous $CO_2$ captured in the blocks.

The compression chamber 110 has a bottom 114, side wall 115 and a top 116, and incorporates injection port 112, venting port 118 and chamber retention assembly 120. Liquid $CO_2$ exits $CO_2$ source 60 via supply line 90, which supply line 90 connects the source 60 to the production assembly 100. The liquid $CO_2$ is shown injected into the chamber 110 at injection port 112. Preferably, the injection port 112 is located near the bottom 114 of the chamber 110. While only one injection port is illustrated, it will be understood that more than one injection port can be provided to inject liquid $CO_2$ into the chamber 110 at more than one location.

Once the injection is complete, the liquid $CO_2$ is boiled off rapidly in order to obtain the highest possible snow production rate inside the chamber 110. This rapid vapor exhaust rate necessitates the use of filter media 122 in order to prevent solid $CO_2$ from exiting the compression chamber 110 through the one or more venting ports 118. Filter media 122 is placed over the one or more venting ports 118 of the compression chamber 110 to maximize the vapor exhaust rate from the chamber 110. Thus, the present block ice press does not require the use of a binding agent mixed with the injected liquid $CO_2$, which binder is used in present ice block processes and would obstruct the filter media 122 of the present invention.

The use of filter media greatly increases the exhaust rate of the present process, which in turn greatly increases the production rate. As the exhaust rate increases, the velocity of the $CO_2$ vapor inside the chamber 110 increases. The velocity of the vapor in the chamber 110 reaches a point wherein it is high enough to carry solid $CO_2$ out of the chamber 110 and into the venting port(s) 118. Yet, this would reduce the efficiency of the present press, as some of the solid $CO_2$ would be lost out of the chamber 110 as well. This action could also destroy a $CO_2$ vapor recovery unit if one is being utilized within the present press. The $CO_2$ vapor recovery would be damaged by the solid $CO_2$ entering the vapor compressor. Using the filter media of the present invention allows a very high vapor exhaust rate while at the same time contains the solid $CO_2$ inside the compression chamber 110.

While it is known to use filter media on snow injected machines, it is novel on liquid injected machines. For example, the Baldwin press cannot utilize filter media because the binding agent that it utilizes (propylene, glycol, and water) would clog the filter media.

A vacuum pump 119 can facilitate the escape of exhaust vapor through the venting ports 118. Further, a temperature probe 113 can be used to monitor the chamber 110 temperature. The temperature reading(s) can come from several locations, including the compressing mechanism 130, lower ram 134, injection port 112 and exhaust port 118. This is done for the purpose of compensating and controlling the injection of $CO_2$ into the press.

Figure 4:
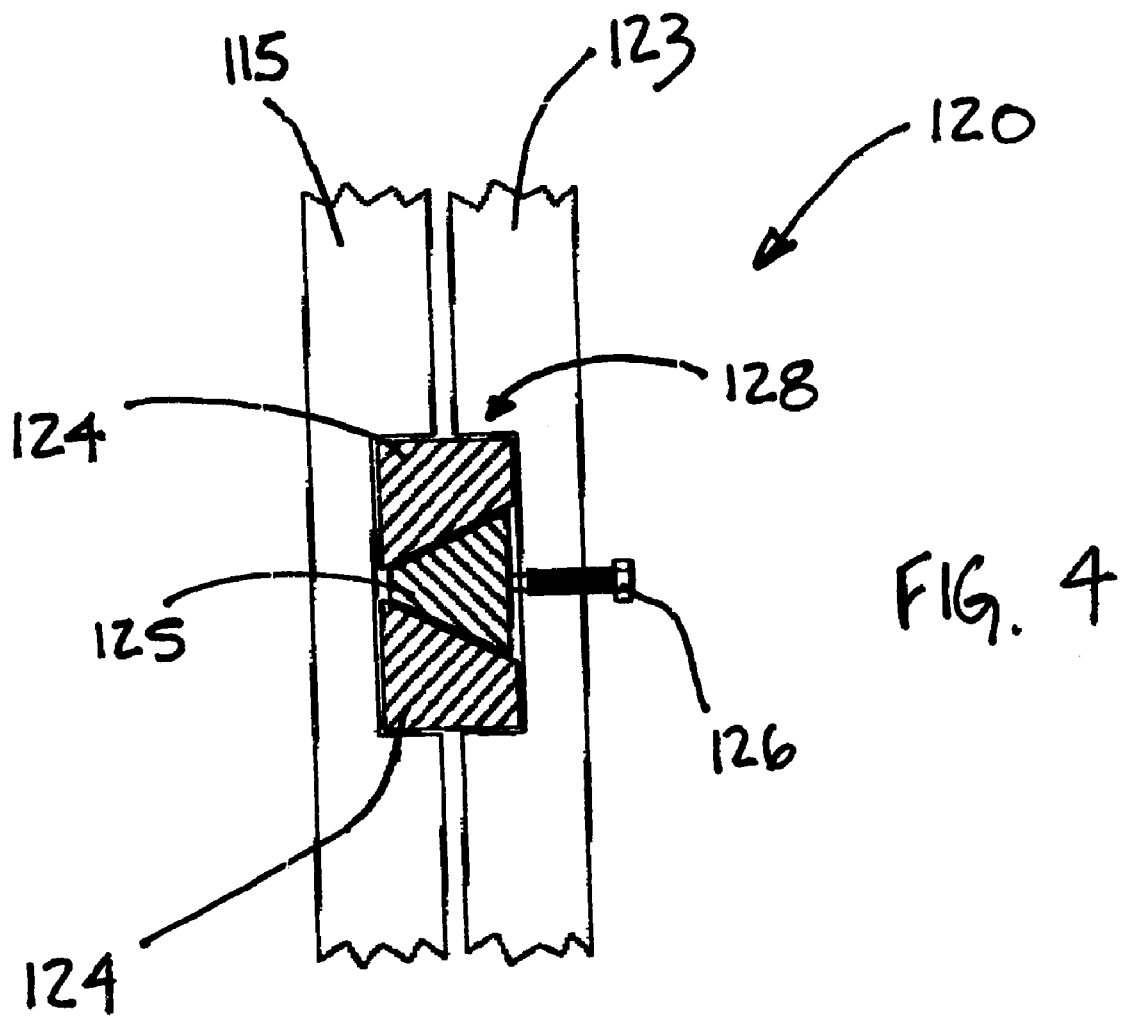
FIG. 4 is a side view of a preferred chamber retention assembly of the present dry ice production assembly.

The chamber retention assembly 120 of the chamber 110 is yet another improvement over the prior art. As shown in detail in FIG. 4, the retention assembly 120 incorporates the use of a chamber retention wedge 125. Chamber retention wedge 125 and two angled keys 124 are placed into a keyway 128 that is created by the chamber wall 115 and the vertical frame channels 123 of the production assembly 100. A bolt 126 that is threaded through the vertical frame channel 123 forces the wedge 125 toward the chamber 110. This motion forces the angled keys 124 apart, which locates and locks the chamber 110 into position in relation to the frame channel 123. The chamber 110 is then free to expand and contract over temperature changes while being held rigidly in place. This freedom of movement prevents stresses from occurring in the chamber 110 during expansion and contraction of the chamber. Further, the chamber retention wedge 125 also makes the present press extremely easy to repair and maintain. The production assembly 100 can include more than one retention assembly 120.

Compressing mechanism 130 comprises a movable piston 134 operative within the closed compression chamber 110, as shown in FIG. 3. Piston 134 compresses $CO_2$ snow formed within compression chamber 110 by atmospheric decompression of liquid carbon dioxide fed under pressure from the $CO_2$ source 60 via main $CO_2$ feed line 90 and supply flow meter 94, to form a single block of solid dry ice. Piston 134 is activated to move within chamber 110 by pumping hydraulic fluid into and out of a hydraulic cylinder (not shown), which moves piston rod 138, which is in turn connected to piston 134. To reverse the travel direction of piston 134, hydraulic fluid is removed from the hydraulic cylinder.

A linear transducer 142 preferably tracks the movement of piston 134. The linear transducer 142 aids in the production of uniform block density through out the various block sizes. The movement of the compressing mechanism 130 can be monitored by the linear transducer 142 and timed. The resulting data provides the velocity of the compressing mechanism 130. Upon the compression of the solid $CO_2$, the determined velocity relates to the strain rate of the solid $CO_2$. While hydraulic pressure, required to produce uniform densities between block sizes, may change, the strain rate remains constant.

Figure 5:
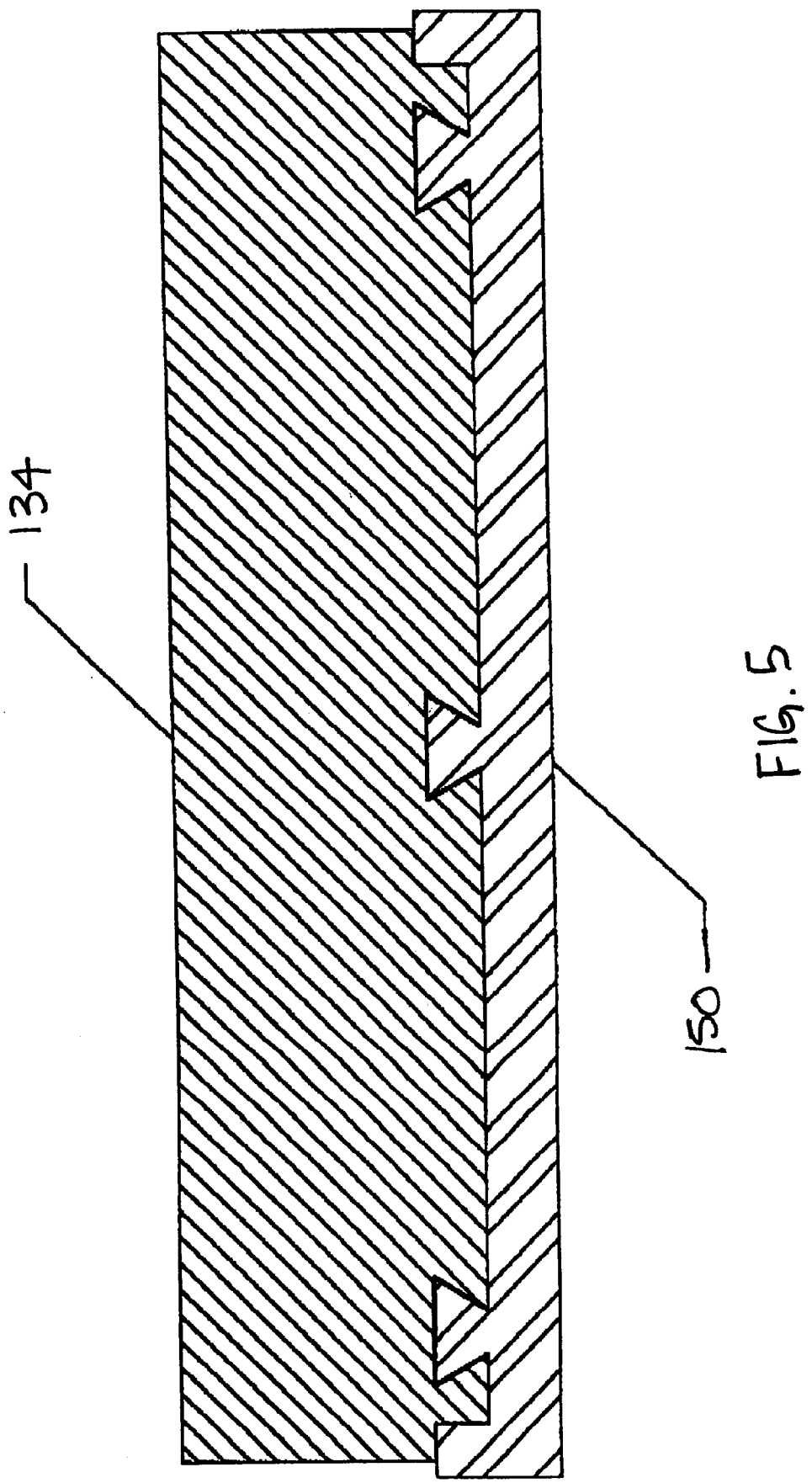
FIG. 5 is a cross-sectional view of the piston of the present invention with a polyethylene, or delrin, surface.

An ultra high molecular weight polyethylene (UHMW), or delrin, plate 150 can surface the compression piston 134 to prevent the dry ice from adhering to the piston, as shown in FIG. 5. UHMW produces a clean, smooth and flat surface that prohibits this sticking. The UHMW can be attached to the piston face using dove tail slots, preventing the polyethylene from moving once it is in the chamber 110. This attachment method eliminates the possibility of fasteners coming out and getting into the ice.

The present ice block process utilizes an exhaust cycle both during and after injection of liquid $CO_2$ into the chamber 110. A first exhaust valve opens at the same time the injection starts. The first exhaust valve enables the pressure inside the compression chamber 110 to reach a pressure above the triple point (60.4 psig), insuring that liquid $CO_2$ is continuously injected into the compression chamber 110. The venting port 118 for the first exhaust valve does not utilize filter media since solid $CO_2$ can not be formed above the triple point. Once injection into the chamber 110 is complete, the first valve closes and a second exhaust valve opens. The second exhaust valve port 118 utilizes the filter media. The pressure inside the compression chamber 110 holds steady while the $CO_2$ passes through the triple point and changes from liquid $CO_2$ into solid $CO_2$. The pressure then begins to fall while the $CO_2$ vapor that was also formed escapes through the filtered exhaust port 118 and into a vapor recovery unit. When the compression chamber pressure falls to approximately 40 psig, it is no longer efficient to attempt vapor recovery. At this point, a third exhaust valve opens and quickly exhausts the remaining $CO_2$ vapor to the atmosphere.

After the exhaust cycles are complete, the solid $CO_2$ is compressed by the compressing mechanism 130. The compression cycle is dependent upon both a preset minimum hydraulic pressure and a minimum compression rate to be reached before completion of the cycle. The automated analysis system of the present invention seeks the predetermined hydraulic pressure. The analysis system receives pressure information from a pressure transducer. When the predetermined hydraulic pressure is reached, the system seeks the compression/strain rate or travel speed from the compressing mechanism 130, and the cycle ends. The minimum compression rate is also predetermined. The automated system also receives information from a linear transducer, which informs the system that the compression piston has reached its minimum speed of travel. This dependency insures nearly consistent density between the various block sizes.

During compression of dry ice snow in conventional presses, any gaseous carbon dioxide contained in the snow will be shut in the resulting solid dry ice block. This trapping of gaseous carbon dioxide is undesirable in that it affects the speed and quality of the pressing operation, and results in dry ice of a quality that is both uneven and prone to early cracking and breakup. This problem is overcome in the present process. A heating element 160 is located proximal to the compression chamber 110 in the area of the formed block as a source of heat energy that is transferred to the block inside the chamber in order to sublimate a micro-thin layer of the dry ice block. This sublimation takes place on the outside surfaces of the block that come into contact with the compression chamber walls. This sublimation provides a space for the gaseous $CO_2$ to escape from the ice block, and prevents the block from adhering to the inside surfaces of the chamber 110. The heating element 160 eliminates the need for dwell time between block compression and block removal from the chamber.

In a prototype of the present invention, it was found that desirable blocks were attained by providing approximately 1500 W on front and rear compression chamber plates 117 and approximately 1200 W on side compression chamber plates. The side compression chamber plates are located in contact with vertical frame channels 123 and the hydraulic cylinders 121 that contain warm hydraulic oil. This enables the side plates to absorb some heat from related components and not be totally dependent on the heating element 160. This lead to the differences in the wattage.

In use, piston 134 is fully retracted upwardly to enable liquid carbon dioxide to enter compression chamber 110 at injection port 112. The injection port 112 is located below the piston 134, preferably one-third of the distance along the compression chamber 110, as measured from the bottom 114 of the chamber 110, to improve the density of the ice. This improvement is achieved because the vapor is forced through the solidified snow that lays on top of the liquid $CO_2$. If two $CO_2$ injection ports are used, they preferably are staggered in distance along the length of compression cylinder 110 allowing for a more complete filing of compression chamber 110 with $CO_2$ snow prior to compression of the snow into a single mass of dry ice. The approximate location of the first injection port is the same as noted above, and the approximate location of the second injection port is approximately two-thirds of the distance along the chamber 110, similarly measured, but not so far along the chamber 110 as to intrude upon an area occupied by a venting port 118.

Forward compressing movement of the piston 134 compacts the $CO_2$ snow formed to make a dense mass of solid dry ice in the compression chamber 110 formed between piston 134 and bottom 114. The ram 138 is raised to close off the open end of the compression chamber 110. The solid $CO_2$ is compressed against the lower ram 138. Once the compression is complete, the lower ram 138 lowers with the compressed block of ice sitting on top.

Gaseous carbon dioxide formed during flashing can escape from inside the compression chamber 110 through one or more vents 118 covered with filter screen 122 after piston 134 retracts; the remaining snow then compressed to form solid dry ice having a predetermined density in weight per volume.

The automated analysis system 170 controls and monitors many of the components of the present invention, including, but not limit to, the injection into the flash vessel, the pressure inside the flash vessel, the quantity of $CO_2$ injected into the compression chamber, the position and velocity of the hydraulic cylinders, the pressure inside the compression chamber, the compression rate of solid $CO_2$ inside the vessel, the heat applied to the chamber, the quantity of ice that the press produces, and the size of the ice. The analysis system preferably comprises a programmable logic controller (PLC) 170.

When the present press is first placed into operation, there is a period of time during which the compression chamber temperature drops from room temperature to a temperature which is closer to that of solid dry ice (i.e., known as the "cool down" period). During this cool down period, the $CO_2$ snow forming in the chamber 110 cools the chamber. The cool down period may last from five to fifteen complete compression cycles before the chamber 110 is cold enough to allow formation of a block of dry ice. During the cool down period, a block of dry ice is formed.

In the production assembly 100, the first injection of liquid $CO_2$ occurs with piston 134 fully retracted and injection port 112 opened. Liquid $CO_2$, at a pressure of about 90 psig, and a temperature of about −55° F., is injected into the chamber 110. When the metered injection period (determined by experimentation) is complete, the PLC 170 begins a degas timer to allow vaporized $CO_2$ to exit the one or more venting ports 118.

When the degas timer has completed its period, piston 134 moves downward, moving from the fully retracted position toward the floor 114 of the chamber 110. Piston 134 continues traveling until the PLC 170 senses via a pressure gauge sensing device that the hydraulic pressure required to move piston 134 begins to increase. The increase in hydraulic pressure signals the PLC 170 that compression of the $CO_2$ snow has begun. At this point, PLC 170 switches the hydraulic system to low speed movement and the piston 134 now moves at about one inch per second (low speed, high pressure mode).

The present invention can produce solid dry ice having a density pre-determined by the constant monitor of temperature of the production assembly 100. As described, the automated analysis system controls the present invention to simultaneously coordinate and activate various operations in response to predetermined set parameters. The analysis system continually monitors, among others, chamber temperature and compensates for changes in temperature to optimize the process of block production. In order to produce blocks of consistent weight from start to finish, the temperature both of the chamber and its related components are measured. Based on these temperature readings, the amount of $CO_2$ injected into the compression chamber 110 is altered to compensate for internal heat in the material of the chamber 110 and its related components. This monitoring process continues for the entire production run of dry ice. This enables the present block press to make a uniform block of ice from the first to the last cycle.

Figure 6:
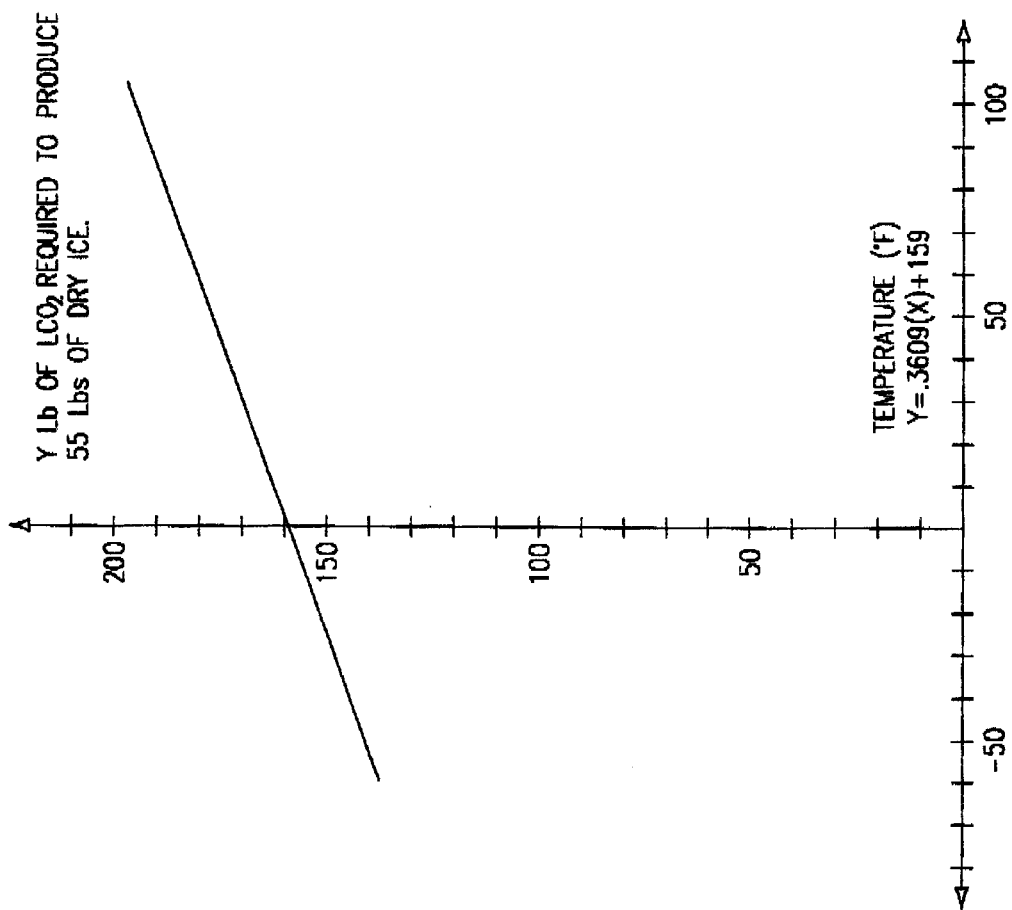
FIG. 6 is a graph illustrating the direct relationship between the rise in pounds of injected liquid $CO_2$ and the rise in temperature of the present invention, in order to manufacture similarly weighted blocks of ice over a run time.

As shown in FIG. 6, as the temperature of the assembly 100 rises, so too does the amount of liquid $CO_2$ injected into the chamber 110 to form continuously uniform block weights. During and after each cycle of the present press (the production of a single block of ice), the temperature of the chamber 110, piston 134 and piston rod 138 can be is monitored by the PLC 170, and the necessary amount of liquid $CO_2$ to be injected into the chamber to produce an similarly weighted second block of ice is calculated. The process is then modified to allow for the increase/decrease (if any) in the amount of injected $CO_2$ due to temperature change, and the cycle repeated. In an experimental run of a prototype, it was found that the amount of liquid $CO_2$ required to produce 55 pounds of dry ice varied proportional with the temperature of the production assembly 100.

The PLC 170 can also monitor a hydraulic pressure gauge sensing device that is an electronic device used to measure the hydraulic pressure exerted by piston 134 against the solid dry ice located within compression chamber 110, to aid in the above injection process.

The PLC can also control the amount of $CO_2$ injected into the compression chamber 110. The control over the amount of $CO_2$ injection is determined by several variables, broadly including both the desired ice block weight, and the temperature of the several components of the dry ice production assembly, including the compression chamber, chamber connecting components, one or more injection lines, one or more exhaust lines, the compressing mechanism piston, rod and lower ram. This information is processed by the PLC and controlled by the supply flow meter 94. The PLC also monitors $CO_2$ usage.

The PLC 170 can also monitor the parameter of atmospheric pressure via a chamber fill pressure sensor within compression chamber 110, monitoring when liquid $CO_2$ is injected via injection port 112. The PLC 170 can further monitor the movement speed and location of piston 134 along the length of compression chamber 110, using shaft position encoders, for example, linear transducer 142, or other locational feedback devices well known in the electronic art, to provide additional feedback to PLC 170 for yet another increase in production output rate of the improved press. The automated process controls of the present invention also can tally the amount of $CO_2$ that has passed through the supply flow meter 94.

The improved method of the instant invention can be easily applied as a retrofit to conventional press machines.

The present press can produce dry ice blocks with uniform block densities over a range of block sizes. To render such similar densities between all block sizes, the controlled compression rate of the piston 134 and the addition of heat by the heating element 160 are required, and provided by the present invention.

Additionally, the present invention can be configured to provide a complete skid mounted package. The present block press can be placed into service without any additional equipment other than a storage unit and a power supply of reasonable size. The block press can come completely assembled with its own flash vessel mounted on the press skid, requiring a minimal amount of material and labor for installation.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. In a method of forming a desired unit of dry ice from $CO_2$ including the steps of (i) introducing $CO_2$ into a chamber and (ii) compressing at least a portion of the $CO_2$ in the chamber until the desired unit of dry ice is formed, the improvement comprising the step (iii) of sublimating a portion of the growing unit of dry ice during the formation of the unit of dry ice, which step (iii) enables at least a portion of any trapped vapor in the growing unit of dry ice to escape the growing unit of dry ice.

2. The improved method of forming a desired unit of dry ice according to claim 1, the step (iii) of sublimating a portion of the growing unit of dry ice during the formation of the unit of dry ice resulting from heating the chamber.

3. The improved method of forming a desired unit of dry ice according to claim 1 comprising the further step (iv) of exhausting vapor from the chamber through filter media enabling a rapid exhaust rate without loss of dry ice from the chamber.

4. The improved method of forming a desired unit of dry ice according to claim 1, wherein a piston having a polyethylene surface plate is used in step (ii) of compressing at least a portion of the $CO_2$ in the chamber until the desired unit of dry ice is formed.

5. The improved method of forming a desired unit of dry ice according to claim 1, further comprising the steps:

iv. monitoring the temperature of the chamber; and v. adjusting the introduction of $CO_2$ into the chamber based upon the temperature of the chamber, wherein as the temperature rises, so too does the amount of injected in order to efficiently form dry ice.

6. A method of forming a desired unit of dry ice without the need of a binding agent, the method comprising the steps of:
- (a) introducing liquid $CO_2$ into a chamber, the liquid $CO_2$ being free of any binding agents and being capable of changing phases in the chamber into portions of gaseous $CO_2$ and solid $CO_2$;
- (b) repeatably compressing at least a portion of the solid $CO_2$ in the chamber to form a growing unit of dry ice, until the desired unit of dry ice is formed;
- (c) heating the growing unit of dry ice, which enables at least a portion of any gaseous $CO_2$ in the growing unit of dry ice to escape the growing unit of dry ice.

7. The method of forming a desired unit of dry ice according to claim 6, the chamber having a dry ice end, an introducing port and a venting port, the growing unit of dry ice being formed at the dry ice end of the chamber by step (b), the introduction of liquid $CO_2$ into the chamber of step (a) being through the introducing port, and the venting port capable of providing a path for degassing the chamber of gaseous $CO_2$.

8. The method of forming a desired unit of dry ice according to claim 6 further comprising the step (d) of degassing the chamber of a portion of the gaseous $CO_2$ through the venting port.

9. The method of forming a desired unit of dry ice according to claim 6, a pressure piston capable of travel within the chamber being used in step (b) of repeatably compressing the solid $CO_2$, the pressure piston having a polyethylene surface plate.

10. The method of forming a desired unit of dry ice according to claim 6, a heater capable of heating the dry ice end of the chamber being used in step (c) of heating a portion of the dry ice.

11. The method of forming a desired unit of dry ice according to claim 6 further comprising the step (d) of repeating steps (a)–(c) to form a similar unit of dry ice, wherein the unit of dry ice is a density of dry ice.

12. The method of forming similar units of dry ice according to claim 11, wherein the unit of dry ice is the weight of dry ice.

13. A method of forming similar units of dry ice comprising the steps of:
- (a) injecting liquid $CO_2$ from a supply of $CO_2$ into a compression chamber having a dry ice end, the chamber further having at least one injection port and at least one venting port, the liquid $CO_2$ capable of changing phases in the chamber into portions of gaseous $CO_2$ and solid $CO_2$;
- (b) degassing the chamber of a portion of the gaseous $CO_2$ through the at least one venting port;
- (c) moving a pressure piston within the chamber to compress a portion of the solid $CO_2$ toward the dry ice end of the chamber;
- (d) heating the dry ice end of the chamber;
- (e) repeating step (b) and (c) until formation of a unit of dry ice;
- (f) removing the unit of dry ice from the chamber; and
- (g) repeating steps (a) through (f) such that subsequent units of dry ice removed from the chamber are similar.

14. A $CO_2$ block press comprising:
- (a) a compression chamber having an injection port through which $CO_2$ can be injected into the chamber and a venting port through which $CO_2$ can vent from the chamber;
- (b) a compressing mechanism operative within the compression capable of compressing $CO_2$ snow formed from injected $CO_2$ into a dry ice block; and
- (c) a heating element located proximal to the compression chamber in the area of the formed dry ice block, the heating element being a source of heat energy that is transferred to the dry ice block inside the chamber, the heating element being capable of sublimating a layer of the dry ice block, which sublimation provides escape for at least a portion of any gaseous $CO_2$ in the dry ice block.

15. The $CO_2$ block press of claim 14, the compression chamber further comprising a chamber retention assembly capable of enabling the expansion and contraction of the chamber through various temperature and pressure ranges within the chamber.

16. The $CO_2$ block press of claim 15, the chamber retention assembly comprising a chamber retention wedge and angled keys within a keyway in a wall of the chamber, the retention wedge located between the angled keys and forcing the keys apart, limiting excess stresses within the wall of the chamber during expansion and contraction of the chamber.

17. The $CO_2$ block press of claim 14, the venting port having filter media in order to limit the amount solid $CO_2$ from exiting the compression chamber through the venting port.

18. The $CO_2$ block press of claim 14, the compressing mechanism comprising a movable piston operative within the compression chamber, the piston having an ultra high molecular weight polyethylene surface to limit the dry ice from adhering to the piston.

19. The $CO_2$ block press of claim 14, further comprising an automated analysis system capable of enabling the $CO_2$ block press to form approximately uniform blocks of dry ice, one after another, by controlling and monitoring the injection of $CO_2$ into the compression chamber, the pressure inside the chamber, both the position and velocity of the compressing mechanism and the heat applied to the chamber by the heating element.

* * * * *

UNITED STATES PATENT AND TRADEMARK OFFICE
CERTIFICATE OF CORRECTION

PATENT NO. : 6,349,565 B1
DATED : February 26, 2002
INVENTOR(S) : Greer, Brian

It is certified that error appears in the above-identified patent and that said Letters Patent is hereby corrected as shown below:

<u>Title page,</u>
Item [57], should read as follows:
-- [57]                     ABSTRACT
An improved $CO_2$ block press and method of forming dry ice. An improvement includes heating a growing unit of dry ice, which enables at least a portion of any gaseous $CO_2$ in the growing unit of dry ice to escape the growing unit of dry ice. The block press can include a $CO_2$ storage vessel, a dry ice production assembly, and an automated analysis system. A chamber retention assembly enables free expansion and contraction of the chamber with temperature changes within the chamber. Filter media can be placed over venting ports in order to maximize the vapor exhaust rate of $CO_2$ from the chamber. The automated analysis sytem permits the production of uniform blocks by monitoring the temperature of the components of the production assembly. --

Signed and Sealed this

Tenth Day of December, 2002

JAMES E. ROGAN
*Director of the United States Patent and Trademark Office*